F. M. LYTE.
Extracting Metal from Ore.

No. 219,961. Patented Sept. 23, 1879.

UNITED STATES PATENT OFFICE.

FARNHAM M. LYTE, OF SAVILE ROW, COUNTY OF MIDDLESEX, ENGLAND.

IMPROVEMENT IN EXTRACTING METALS FROM ORES.

Specification forming part of Letters Patent No. 219,961, dated September 23, 1879; application filed June 16, 1879.

*To all whom it may concern:*

Be it known that I, FARNHAM MAXWELL LYTE, of Savile Row, in the county of Middlesex, England, have invented a new and useful Improvement in Separating Metals from Ores; and I do hereby declare that the following is a full, clear, and exact description of the same, reference being had to the accompanying drawings, in which—

Figure 2:
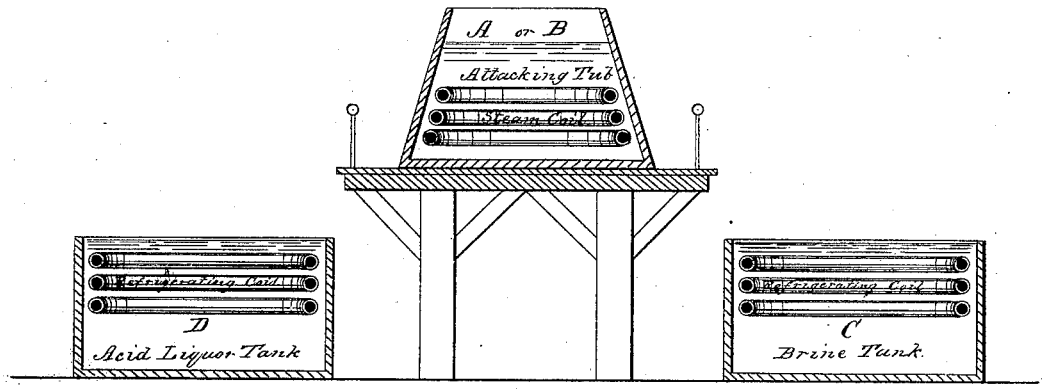
Figure 1:
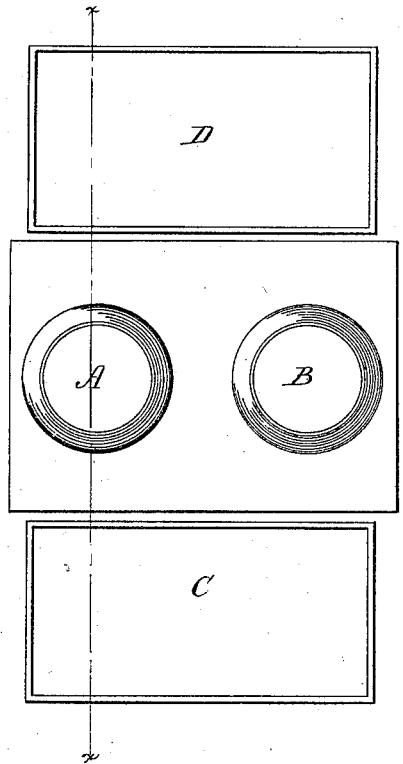

Figure 1 is a plan view of a set of apparatus for carrying out my invention. Fig. 2 is a vertical section through the line $x\ x$ of Fig. 1.

My invention relates to an improvement in the process of separating metals from ores containing lead, zinc, silver, and copper, which improvement is designed to effect the neutralization of the soluble bases, to economize acid, and to carry over the least possible quantity of silver and lead.

The improvement consists in treating the raw ores with an acid solution partially saturated by previous attack on the ores, and treating the partially-exhausted ore with raw acid before the latter is admitted to the raw ore, the said steps being conducted in a continuous, alternate, and methodical manner, as hereinafter described.

In carrying my improved process into practical operation I employ apparatus consisting of a set of vessels suitably disposed, so as to be able to effect a series of decantations in regular and successive order, and in such a manner that each lot of acid may be made on the one hand to pass successively over two or more lots of ore, the result of which is that the said acid becomes more completely saturated and neutralized by the soluble and attackable constituents of the ore, while on the other hand each lot of ore receives treatment by at least two acid solutions—that is to say, first, when raw and more easily attacked it is treated by a partially-saturated acid, which has been already used in a previous attack; and, secondly, when, having lost part of its soluble constituents, it has become less easily attackable, it is treated a second time, but with fresh acid, which has not yet acted on any previous lot of ore. The extraction of the metals is thus made more complete.

The insoluble sulphate or chloride of lead remaining with the gangue and retaining the silver which the ore may contain is successively extracted by one or more boilings or heatings in strong brine, which is made completely to take up and carry over into another vessel suitably disposed all the dissolved lead and silver, and desposit them there as crystalline chlorides on cooling.

In some cases the brine may be with advantage acidulated. About one or two per cent. of acid relatively to the quantity of brine will usually be found sufficient.

If any antimony or bismuth are contained in the ore, these are either carried off by the acid treatment or become more or less dissolved, together with the silver and lead in the hot brine, and are carried over with the lead and silver; but the antimony and bismuth do not, like the silver and lead, separate on cooling, but are retained in the brine.

By this mode of treatment, while I obtain a considerable economy in the quantity of acid employed, I also (which is very important) carry over with the chlorides of zinc and other bases forming soluble chlorides or sulphates the least possible proportion of lead or silver, these being only slightly soluble in well neutralized solutions of zinc and other bases, (which are conventionally but perhaps, strictly speaking, rather improperly distinguished from the alkalies or the alkaline earths as metallic bases,) and remaining consequently with the gangue in the attacking vessel. These salts of lead and silver when treated with hot or boiling brine dissolve therein as chlorides, no matter whether they may be originally present as sulphates or chlorides.

It here becomes necessary to make a few remarks relating to the solubility of silver and lead chlorides in brine and the mode of separating them from antimony or bismuth when those metals, or either of them, may be present.

I have ascertained that lead-chloride is soluble in boiling saturated solution of sodium-chloride (brine) to the extent of about 1.35 parts (= 1 part of metallic lead) to 25 of boiling brine, whereas on cooling down to ordinary temperatures most of the chloride of lead crystallizes out until no more than about 1 of metallic lead to 800 or 1,000 of brine remains in solution. Silver, on the other hand, is soluble in the same liquid to the extent of about .75 parts of silver, under the form of silver-chloride, to 1,000 of brine at 10° to 12° centigrade, about .90 of silver to 1,000 of brine at 25° to 26° centigrade, and about double that quantity at a boiling temperature.

The presence of lead-chloride in the brine seems rather to increase this rate of solubility of silver as silver-chloride. The solution of silver-chloride in brine appears to be peculiarly liable to what is termed "supersaturation"—so much so that it will often be found that brine saturated hot with silver-chloride will remain clear on cooling until some determining cause, such as the addition of an atom of solid silver-chloride, intervenes, when immediately the whole liquid will turn milky from the separation of silver-chloride. This condition of supersaturation seems less liable to occur when lead-chloride is present in the brine together with silver-chloride.

It thus becomes evident that when lead and silver chlorides are together present they may be taken up together and held in solution by boiling or hot brine, and the liquid being decanted off and cooled will deposit most of the lead and silver together as chlorides. The supernatant liquid being now drawn off, may be made again to take up a fresh portion of lead-chloride, or lead and silver chlorides, by boiling or heating it strongly in contact with a further portion of these salts, and may be again decanted into the same cooling-vessel as before. On being again cooled it deposits its new charge of lead or lead and silver chlorides with consequent regeneration of its solvent powers. Thus with one and the same batch of brine any reasonable quantity of lead or lead and silver chlorides may be carried over by successive treatment, and be deposited in the cooling-vessel by alternate heatings, decantations, and coolings, the solvent powers of the brine being thus able to be regenerated by what is practically nothing more than mere cooling any reasonable number of times. It is this carrying power of brine for lead or lead and silver chloride which I have been able to utilize in my improved process of separating metals in ores.

Should antimony, bismuth, or other metals soluble in brine be present, they will be found, according to the forms in which they existed, to have been more or less taken up by the brine and be transported with the lead and silver; but they will still be retained in the brine solution when on cooling it precipitates lead and silver from the solution, in which, however, a certain portion of those last-named metals may be still retained. The presence of the antimony, bismuth, or other soluble metals thus retained in solution does not appear materially to affect the solvent and carrying powers of the brine for fresh charges of silver or lead chlorides. I utilize these reactions, then, for separating lead and silver from other metals—for example, in the treatment of lead or lead and silver ores containing antimony.

The crystalline wet deposit of lead and silver chloride is washed with a little fresh cold brine, if requisite, and then may be reduced with zinc, when it will be found to yield soft lead mixed with silver, but free from antimony, bismuth, or any other metals.

It should be observed, in accordance with what has been above stated, that the silver does not precipitate entirely out of the brine together with the lead, and where present in small proportion more or less, or even the whole, of the silver may be retained in solution by the cooled brine. Traces also of this metal will generally be found in the solution of the chlorides dissolved by the acid treatment.

The best mode of extracting this silver, whether from the brine or the soluble metallic chlorides taken up by the hydrochloric acid, (should that acid have been employed,) is to immerse in the liquid some metallic lead.

The spongy lead formed by reducing lead chloride with zinc answers very well, or some of the lead contained in the liquids themselves may be reduced by zinc, and left to digest in or boiled in the liquid, when this lead will be observed to take on a peculiar gray tint, due to precipitation of silver, and will gradually collect all traces of silver from the solutions.

It should also be observed that if metallic lead be digested with the hot brine before the lead chloride has crystalized at all, it will collect all the silver in a similar manner, some of the lead passing into solution in replacement of silver precipitated.

By collecting all the silver by means of a small quantity of lead highly argentiferous lead can be produced fit to go direct to the cupel without any intermediate process.

I specially specify the employment of lead as being the most suitable and convenient in these circumstances, and offering special facilities for the subsequent separation and refining of the silver, and as being for this reason far superior to iron, copper, or any other of the metals, the employment of which may have been proposed for collecting silver from its solutions. In view of this fact of some of the silver remaining in the brine, together with what lead is still retained in solution after cooling, the advantage accruing from the employment of as restricted a quantity of brine as possible, and the using of the same brine over and over again as a carrier and depositor of the lead or lead and silver will be obvious, for by this means the least possible quantity of silver is retained by the brine. On the other hand, if desirable, by so graduating the quantity of the brine as to make it sufficient to retain the whole of the silver in solution, this metal may be thrown down and collected by boiling or digesting spongy or other metallic lead in the brine, and the usually-employed processes of desilverizing, or rather what should be called "concentrating" the silver in the lead previous to cupellation, may be done away with, the silver being thus at once obtainable in a sufficiently-concentrated form for immediate cupellation.

I arrange the tubs in which the ore is to be attacked in such a manner as to be able conveniently to decant the liquids from any one of these to any other, and I perform, in succession, first, the drawing off of the saturated acid solutions of the soluble bases into a reservoir; second, the addition of fresh acid to the partially-attacked ore, from which the above saturated solutions have been decanted; and, third, the subsequent extraction of the lead and silver from the gangue with brine in such order that, while the saturated or neutralized chloride of zinc or copper is drawn off at one end of the series, fresh acid is poured onto the partially-extracted ore at the other end, fresh acid not on the one hand being poured onto fresh ore, nor any solution on the other hand being decanted off into the reservoir until it has passed over fresh ore.

It will be seen that my object is to obtain more perfectly neutralized solutions of the bases soluble in acids.

Where hydrochloric acid is employed, this form of treatment is specially necessary in order to prevent the lead or lead and silver chlorides from being retained in solution and carried over in large quantity by the solution of zinc and other soluble bases, it being desirable to retain the lead and silver as far as possible with the gangue in order to be extracted afterward by the brine.

I shall now for better explanation proceed to illustrate my process as applied to a treatment of Anglesea bluestone by acid chlorination with hydrochloric acid. It, however, must be understood that I also intend my invention to be applicable to all cases where it is intended to separate lead or lead and silver from either or any of the above-named metals by means of acids or brine. For the better elucidation of this process I will now describe its working with an example of its practical application with the arrangement of apparatus which I have found most beneficial.

For the sake of simplicity I will suppose, in my description, that only two attacking tubs are employed in series, as illustrated in the annexed drawings, though the same principle can be applied to any greater number.

A and B are two attacking or dissolving tubs. They may be round, and heated by means of a steam-coil passing round the interior about six inches from the bottom. If from one-fourth to one-half a ton of calcined bluestone is to be treated at a time, each tub may be, say, five feet diameter at the bottom, and four feet six inches at the top, by four feet to four feet six inches in depth. They should be placed on a raised platform, higher than the other tubs now to be described, and conveniently fitted with taps or siphons, for drawing off the liquors, when required.

The ore is agitated very conveniently by a steam-jet blown into the liquid so soon as it has been brought to boil by the steam-coil; but any other form of agitation may be employed.

C is a large tank, placed just lower than the bottoms of A and B, and is to contain brine. It is furnished with a cooling-coil passing round its upper part, or some other arrangement of pipes through which a stream of cold water can be passed for cooling purposes; but other forms of refrigeration may be employed. D is another tank, which is empty, and may conveniently be likewise furnished with a refrigerating apparatus, and may stand on the same level as C. This tank or reservoir D serves to receive the acid solution of the soluble bases which the ore may contain.

Some pounded ore, calcined or not, as the case may require, is placed in A. This is wetted with a little water, to prevent its caking together on adding the acid, and the quantity of acid which may be sufficient to combine with all the soluble and attackable bases the ore may contain is then poured over it. If hydrochloric acid be used, acid of a strength corresponding to 15° Twaddell answers well.

The quantity of acid to be employed will vary with the composition of each kind of ore. The solution is then heated to about boiling-point, and as soon as the intensity of the reaction begins to diminish notably the liquor, still very acid, is to be drawn over into B, in which has been placed a like quantity of pounded ore, wetted with water, as above. Here the liquor is again boiled and stirred. This causes the acid to become as nearly saturated as possible by taking up a further quantity of the more soluble metallic oxides contained in this new batch of ore. Having then thus passed through these two tubs in succession and over two lots of ore, the liquor, after being let to settle, is decanted into the reservoir D. Meanwhile a new portion of acid is poured onto the ore remaining in A, and boiled and decanted into B, as before.

By this means all the soluble bases are taken out of the ore in A. Some brine—say, about the same quantity as that of the acid used—is to be pumped from the tank C into A and brought to boil, and agitated. This will generally suffice to take up all the lead and silver at once. It is allowed to settle as clear as possible, keeping the tub A covered to prevent cooling, and is then drawn off back into C. If necessary, a further charge of brine is to be passed over the residue in A, when all the lead and silver will almost inevitably have been taken up, mixed with antimony or bismuth, if either of those metals be present, and carried over into C. The gangue is now removed from A and a supply of fresh ore is introduced and wetted with water, as before. The ore in B is now treated with a charge of acid and boiled, and this decanted into A, and thence, as before, into D, the residue in B being now extracted with brine from C, as before, and the gangue removed and a fresh charge of ore introduced, and so on continuously.

From this description it will be understood how my improved process of separating metals by an alternately-conducted methodical treatment may be carried out in practice.

The liquors in D contain but little lead or silver, and as they cool these for the most part crystallize out and may be removed and added to the brine in C, while in C the lead and silver accumulate from the collective successive treatments, and these separate out in a crystalline form as chlorides. So soon as a sufficient quantity of the chlorides of lead and silver have accumulated in C, the brine may be drawn off, and into the muddy deposit representing the crystalline chlorides lumps of zinc are to be plunged, and these reduce the metals, which may then be collected and melted into ingots. The chloride of zinc produced may be added to that in reservoir D.

When we have to deal with an ore containing antimony or bismuth mixed with lead or lead and silver, the antimony or bismuth is dissolved and taken up more or less completely by the acid solutions. A small part of these will, however, remain in the brine. This, however, as above stated, appears not to interfere with the carrying powers of the brine in which these metals are retained when the liquid is cooled, while the lead and silver chlorides are deposited free from antimony.

My improved process, as is obvious, then affords an excellent means for the separation of antimony and bismuth from lead or lead and silver.

In cases where I have to treat lead ores or lead and silver ores, or residues or natural products containing these, as sulphates or chlorides already formed, (as, for instance, in treating flue-stuff from lead-works, antimonial silver, and lead-ores which have been previously sulphated or chlorinated, residues from which soluble zinc, nickel, or other chlorides or sulphates have been extracted by previous lixiviation,) of course the operation becomes so far simplified.

The reservoir D may be done away with, since the acid attack becomes no longer necessary, and only one heating-tub need be used to attack the material with brine. It suffices, then, in this case to use only the brine-reservoir and one attacking-tub.

The brine acts better if it be slightly acidulated. The same principle, however, of using brine as a carrier here holds good. If the chlorination or sulphatation is incomplete it should, however, be completed with more acid.

The lead or lead and silver may now be taken up, drawn over and deposited by brine, using over and over again the same brine for the carrying of successive charges of these metals, which are deposited as chlorides, by cooling and then reducing them to the metallic state in the same way as above described in cases where my complete process is employed.

It will be seen then that the process in this case thus remains virtually the same, the sole difference being the suppression of the acid treatment where not requisite, and the use of the brine as a carrier for the lead and silver continues as before described. Solutions of most of the other soluble alkaline, earthy, and metallic chlorides might be substituted for the brine in this process, but they are for the most part more costly, and as their differential solvent powers for lead and for lead with silver when hot and cold are generally less than those of brine, their carrying powers are less complete. The latter, then, is specially recommended as the carrying agent.

The following may be considered as a summary of the advantages accruing from the above-described mode of treatment: First, better saturation of the acid by the soluble constituents of the ore, and consequent economy of acid; second, more complete attack of the ore, and consequent better extraction of the metals it contains; third, more complete separation of the zinc and copper from the lead and silver; fourth, the copper is obtained in a solution from which it can be more easily thrown down; fifth, with but a small quantity of brine a large quantity of lead and silver may be carried over by these systematic successive heatings, decantations, and coolings; sixth, the lead and silver are obtained together in the best available form and very pure; seventh, the antimony may be eliminated; eighth, the quantity of zinc used up in the reduction of the chlorides to the metallic state is diminished to a minimum; ninth, greater rapidity of working is obtained, and the same amount of work is done with the least possible quantity of plant; tenth, the metallic sponge of lead remaining after the reduction of the chloride-of-lead mud subsequent to decanting the supernatant brine is obtained in a more dense coherent form, allowing thus of being more easily washed from any traces of precipitated antimony, as well as from any adherent gangue, than if it were precipitated from a larger quantity of brine.

The proportions and form of apparatus herein described may, as will be apparent to a person conversant with processes of a like nature, be easily varied as in practice may be found desirable.

It will be seen that this invention divides itself naturally into four heads, viz: First, the application of the methodic alternate and continuous treatment; second, the obtaining well-neutralized solutions of the more soluble bases, whereby the least possible quantities of lead or silver are carried over when the acid solution is decanted; third, the utilization of the extraordinary differences of solubility in hot and cold brine, respectively, of chloride of lead or of the mixed chlorides of lead and silver, thus enabling the brine to be employed as a carrier for these metals; fourth, the utilization of the fact that when lead and silver are dissolved in hot or boiling brine, together with antimony, bismuth, or other metals, as chlorides, the lead or lead and silver alone separate out on cooling, leaving antimony, bismuth and the other metals in solution.

Having thus described my invention, what I claim is—

In the treatment of ores containing lead, zinc, silver, and copper, the method of securing the neutralization of the solutions of soluble bases, economizing acid, and carrying over the least possible quantity of silver and lead, which consists in treating the raw ores with an acid solution partially saturated by previous attack on the ores, and treating the partially-exhausted ore by raw acid before the latter is admitted to the raw ore, the said steps being conducted in a continuous, alternate, and methodical manner, as described.

The above specification of my invention signed by me this 18th day of March, 1879.

FARNHAM MAXWELL LYTE.

Witnesses:
WM. CLARK,
  *Patent Agent, Chancery Lane, London.*
T. W. KENNARD, *his clerk.*